W. H. STOCKTON.
AUTO LIGHT CONTROL.
APPLICATION FILED MAR. 26, 1920.

1,390,937.

Patented Sept. 13, 1921.
2 SHEETS—SHEET 1.

W. H. Stockton, INVENTOR

BY Victor J. Evans
ATTORNEY

WITNESS:

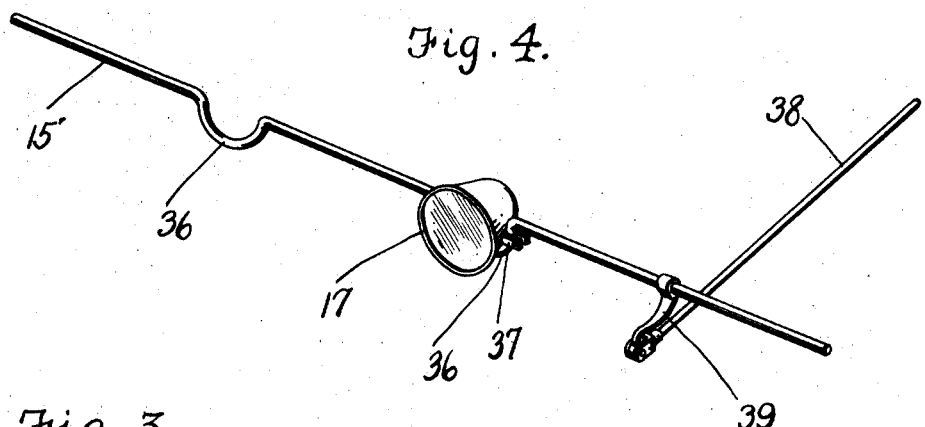
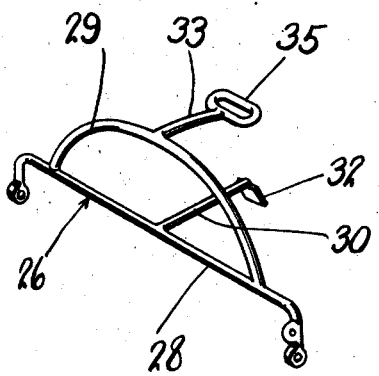

UNITED STATES PATENT OFFICE.

WILLIAM H. STOCKTON, OF ASHTABULA, OHIO.

AUTO-LIGHT CONTROL.

1,390,937. Specification of Letters Patent. Patented Sept. 13, 1921.

Application filed March 26, 1920. Serial No. 368,946.

*To all whom it may concern:*

Be it known that I, WILLIAM H. STOCKTON, a citizen of the United States, residing at Ashtabula, in the county of Ashtabula and State of Ohio, have invented new and useful Improvements in Auto-Light Control, of which the following is a specification.

This invention relates to improvements in vehicle headlights, the object being to provide means for regulating the elevation of the light rays to prevent the glare from interfering with approaching persons and to direct the rays upon the roadway in advance of the vehicle.

Another object is the provision of means located within convenient reach of the driver of the vehicle for adjusting the lights and for this purpose novel means is provided for mounting the lamps and connecting the same to an operating device, which latter is also of novel formation.

A further object is the provision of a device of the above character, which is simple of construction and operation and which may be easily mounted in position for use.

With the above and other objects in view, the invention further includes the following novel features and details of construction, to be hereinafter more fully described, illustrated in the accompanying drawings and pointed out in the claim hereto appended.

In the drawings:—

Fig. 3 is a detail perspective view of the operating member.

Fig. 4 is a similar view showing a slightly different form of mounting the headlights.

Figure 1:
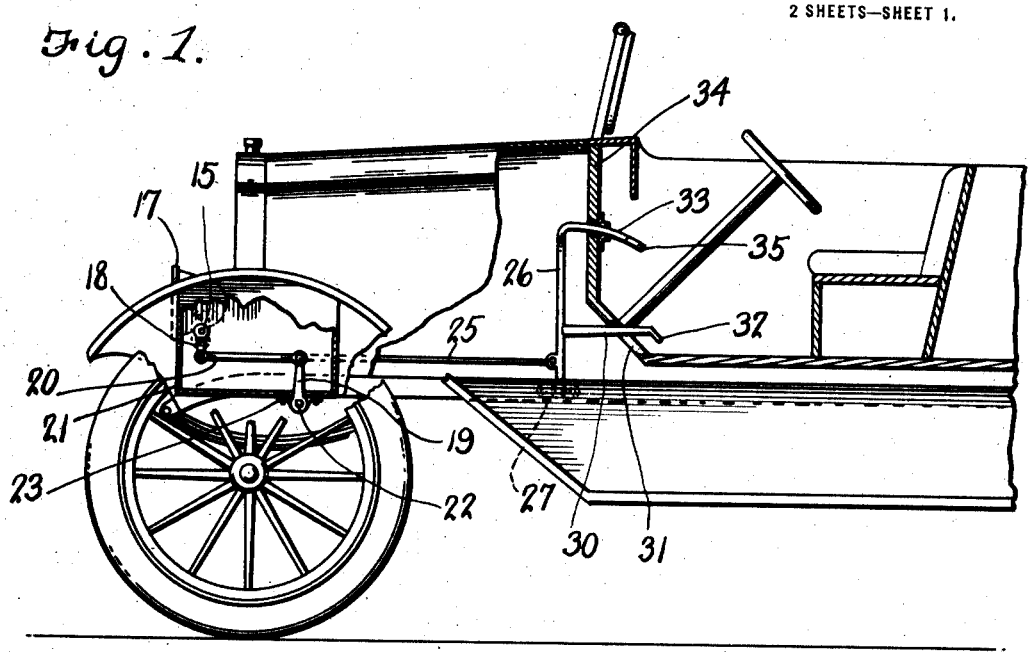
Figure 1 is a sectional view with parts broken away to illustrate the connection of the headlights with the operating member.
Figure 2:
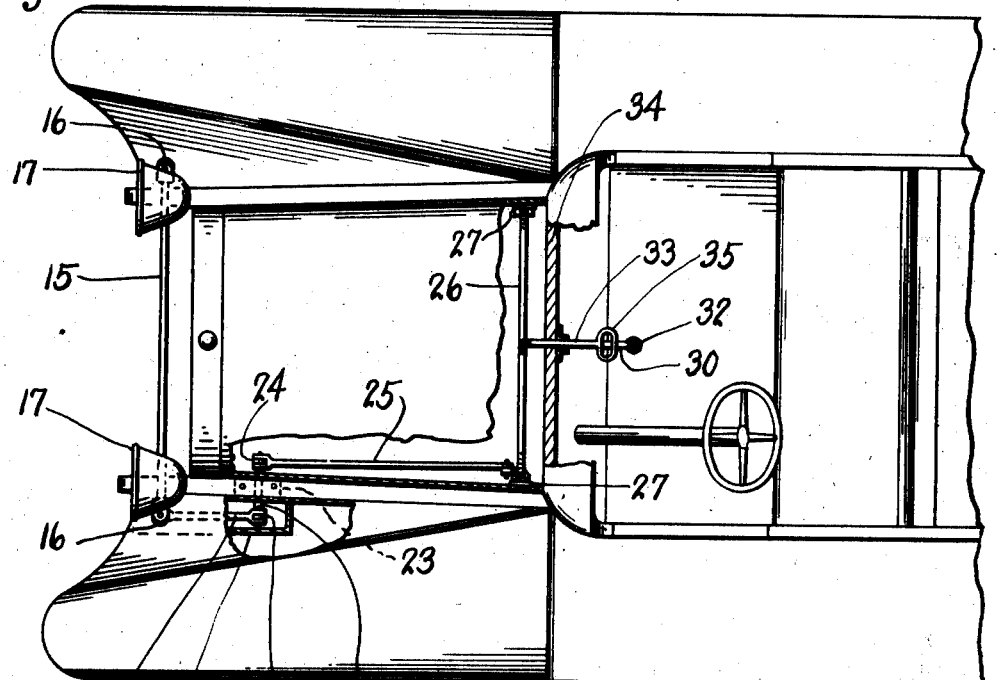
Fig. 2 is a top plan view partly broken away.

Referring to the drawings in detail, wherein like characters of reference denote corresponding parts, the form of the invention illustrated in Figs. 1 and 2 includes a rock shaft 15 which is disposed transversely of the vehicle in front of the radiator and mounted in bearings 16, preferably secured to the front mud guards. Secured upon the rock shaft 15 are lamps 17, which may be of any suitable or desired construction.

The shaft 15 extends through one of the mud guards and has secured thereon a crank arm 18, the said arm being connected with a crank arm 19 by means of a rod 20. The arms 18 and 19 and the rod 20 are preferably inclosed in a suitable housing 21 to protect them from dust and dirt. The crank arm 19 is mounted upon one end of a short shaft 22 which is mounted in a bearing 23, preferably carried by the frame of the vehicle. This shaft extends inwardly and has connected to its inner end a crank arm 24 to which is connected one end of a rod 25. The rod 25 extends rearwardly within the hood and has its inner end connected to an operating member in the form of a yoke 26 which is mounted for pivotal movement in bearings 27 secured within the hood of the vehicle. The yoke 26 extends transversely within the hood in advance of the dash board 34 and comprises a substantially horizontal bar 28 and a bail 29. The bar 28 carries an arm 30 which extends through an opening 31 in the vehicle dash board 34 and is provided with a foot pedal 32, while the bail 29 is also provided with an arm 33, which, like the pedal 32 extends through the vehicle dash board. The end of the arm 33 is provided with an operating handle 35.

In reference to the drawings, it will be seen that the shaft 15 may be rocked in its bearings to regulate the elevation of the light rays, by moving the yoke 26 upon its pivots through the medium of either the foot pedal 32 or the handle 35, which are within convenient reach of the driver.

In Fig. 4 there is illustrated a slightly different form of mounting the lamps 17. This consists of providing substantially semi-circular seats 36 in the rock shaft 15 and of securing the lamps within these seats by means of clamps 37, illustrated in Fig. 5. If desired a connecting rod 38 may have one end connected to the yoke 26 and its opposite end connected directly to an arm 39 secured upon a shaft 15.

The invention is susceptible of various other changes in its form, proportions and minor details of construction and the right is herein reserved to make such changes as properly fall within the scope of the appended claim.

Having described the invention what is claimed is:—

The combination with a vehicle, of a rock shaft disposed transversely of the vehicle in front of the radiator and mounted in suitable bearings upon the front mud guards, a pair of lamps secured to said shaft, a crank arm secured to one end of said shaft, a rod pivotally connected to said arm, a second crank arm pivotally connected to the rod, a short shaft journaled in suitable bearings beneath the vehicle frame and secured to the second crank arm, a third crank arm secured to the opposite end of said short shaft, a rod pivotally connected to the third crank arm, a yoke pivotally connected to the last mentioned rod, a pair of arms formed integrally with said yoke and extending through the vehicle dash board, a handle formed upon the end of one of said arms and a foot pedal formed upon the end of the other arm for actuating said lamps aforesaid.

WILLIAM H. STOCKTON.